US012656739B2

(12) United States Patent
Yasuda

(10) Patent No.: US 12,656,739 B2
(45) Date of Patent: Jun. 16, 2026

(54) PUSH BUTTON DEVICE, TIMEPIECE AND ELECTRONIC DEVICE

(71) Applicant: CASIO COMPUTER CO., LTD., Tokyo (JP)

(72) Inventor: Takumi Yasuda, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 636 days.

(21) Appl. No.: 17/939,468

(22) Filed: Sep. 7, 2022

(65) Prior Publication Data

US 2023/0070965 A1 Mar. 9, 2023

(30) Foreign Application Priority Data

Sep. 7, 2021 (JP) ................................. 2021-145329

(51) Int. Cl.

*G04B 27/00* (2006.01)
*G04B 27/08* (2006.01)
*H01H 13/14* (2006.01)

(52) U.S. Cl.

CPC ........... *G04B 27/005* (2013.01); *G04B 27/08* (2013.01); *H01H 13/14* (2013.01)

(58) Field of Classification Search

CPC ........ H01H 13/00; H01H 13/04; H01H 13/06; H01H 13/14; H01H 13/50; H01H 13/52; H01H 3/12; H01H 2223/00; H01H 2223/002; H01H 2223/004; H01H 2223/04; H01H 2003/12; H01H 2009/02; H01H 2013/00; H01H 2013/50; H01H 2013/52; G04B 27/005; G04B 27/08; G04B 27/00

USPC ........................................................ 200/341

See application file for complete search history.

(56) References Cited

U.S. PATENT DOCUMENTS

| | | | | |
|---|---|---|---|---|
| 3,621,649 | A * | 11/1971 | Vulcan et al. | G04B 37/10 968/339 |
| 11,150,610 | B2 | 10/2021 | Yasuda | |
| 2020/0110370 | A1 | 4/2020 | Yasuda | |
| 2021/0405593 | A1 | 12/2021 | Yasuda | |

FOREIGN PATENT DOCUMENTS

| | | | |
|---|---|---|---|
| JP | S5686726 | U | 7/1981 |
| JP | S572483 | U | 1/1982 |
| JP | H0188430 | U | 6/1989 |
| JP | 2006019112 | A | 1/2006 |
| JP | 2007256067 | A | 10/2007 |
| JP | 4521715 | B2 | 8/2010 |

(Continued)

OTHER PUBLICATIONS

Notification of Reasons for Rejection dated Aug. 1, 2023 received in Japanese Patent Application No. JP 2021-145329.

(Continued)

*Primary Examiner* — Anthony R Jimenez

(74) *Attorney, Agent, or Firm* — Scully, Scott, Murphy & Presser, P.C.

(57) ABSTRACT

A push button device including a supporting member provided with a through hole, an operation member having a shaft slidably inserted into the through hole, and a head provided on an outer end of the shaft, and an elastic member which is contracted to be arranged between the head and the supporting member, and further contracted in response to a movement of the operation member.

14 Claims, 6 Drawing Sheets

(56) References Cited

FOREIGN PATENT DOCUMENTS

| | | | |
|---|---|---|---|
| JP | 2017219448 | A | 12/2017 |
| JP | 2019070655 | A | 5/2019 |
| JP | 2019219224 | A | 12/2019 |
| JP | 2020056760 | A | 4/2020 |
| JP | 2021009117 | A | 1/2021 |
| JP | 2021039132 | A | 3/2021 |
| JP | 6913304 | B2 | 8/2021 |

OTHER PUBLICATIONS

Notice of Reasons for Refusal dated Apr. 15, 2025 for Japanese Patent Application No. 2023-210795.

* cited by examiner

PUSH BUTTON DEVICE, TIMEPIECE AND ELECTRONIC DEVICE

CROSS-REFERENCE TO RELATED APPLICATION

This application is based upon and claims the benefit of priority from the prior Japanese Patent Application No. 2021-145329, filed Sep. 7, 2021, the entire contents of which are incorporated herein by reference.

BACKGROUND OF THE INVENTION

1. Field of the Invention

The present invention relates to a push button device, a timepiece equipped with the push button device, and an electronic device equipped with the push button device.

2. Description of the Related Art

For example, a push button device for wristwatches is known which has a structure where a cylindrical member is provided in a through hole in a wristwatch case, the shaft portion of an operation member is inserted into the cylindrical member, the head portion of the operation member is positioned to protrude outside the wristwatch case, and a contact switch in the wristwatch case is subjected to a switch operation by the protruding head portion being pressed, as described in Japanese Patent Application Laid-Open (Kokai) Publication No. 2007-256067.

This type of push button device for wristwatches has a structure where a housing recess section into which the head portion of the operation member is inserted is formed in the outer surface side of the wristwatch case, a coil spring is arranged in the housing recess section, and the head portion of the operation member is pressed toward the outside of the wristwatch case by the spring force of the coil spring. In addition, this push button device has a structure where a plurality of waterproof members are provided on the outer circumference surface of the shaft portion of the operation member, and the operation member is slid with the waterproof members being in contact with and pressed against the inner circumferential surface of the cylindrical member.

SUMMARY OF THE INVENTION

A push button device comprising: a supporting member provided with a through hole; an operation member having a shaft slidably inserted into the through hole, and a head provided on an outer end of the shaft; and an elastic member which is contracted to be arranged between the head and the supporting member, and further contracted in response to a movement of the operation member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

A first embodiment where the present invention has been applied in a wristwatch will hereinafter be described with reference to FIG. 1 to FIG. 3.

Figure 1:
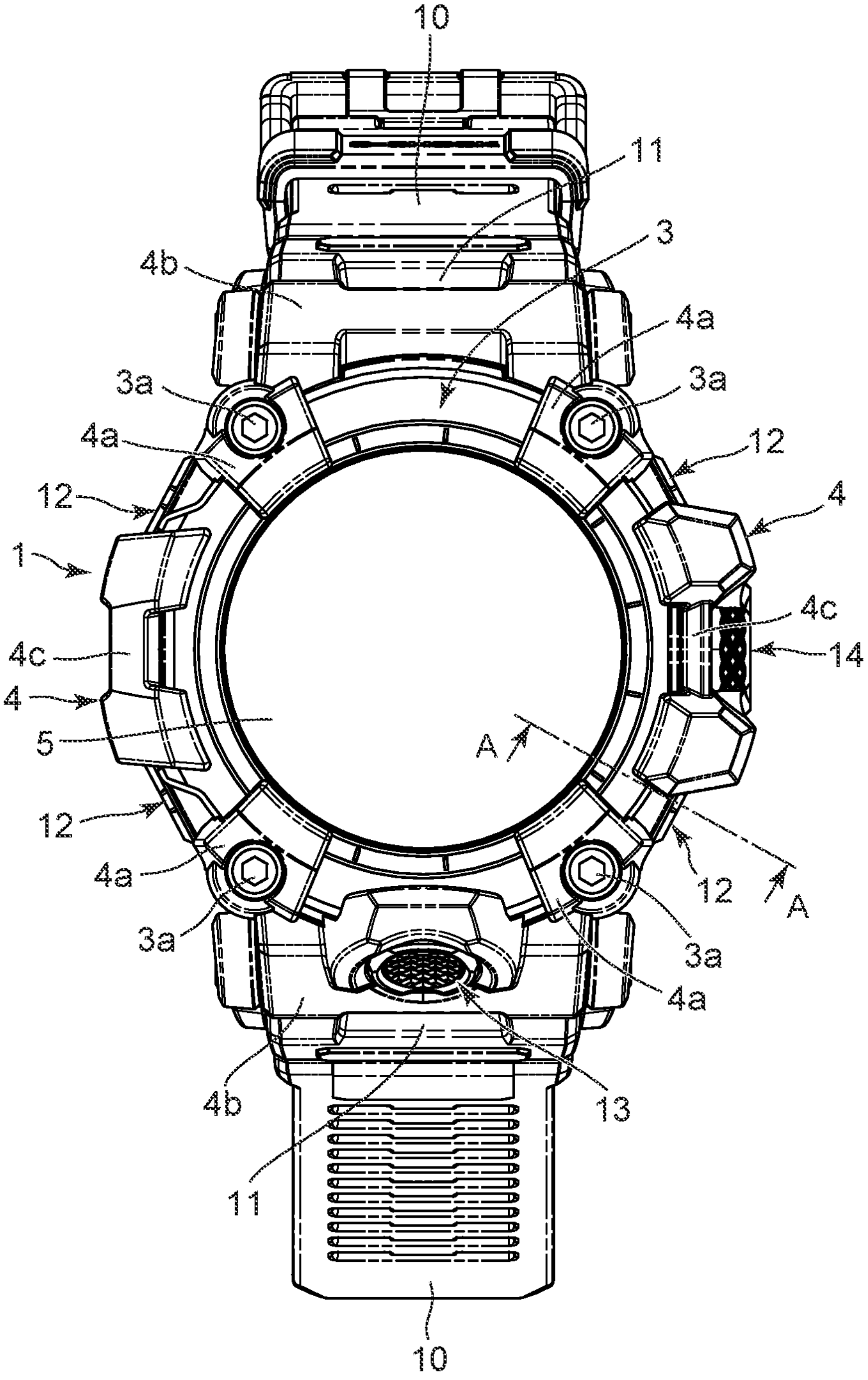
FIG. 1 is an enlarged front view showing a first embodiment where the present invention has been applied in a wristwatch.
Figure 2:
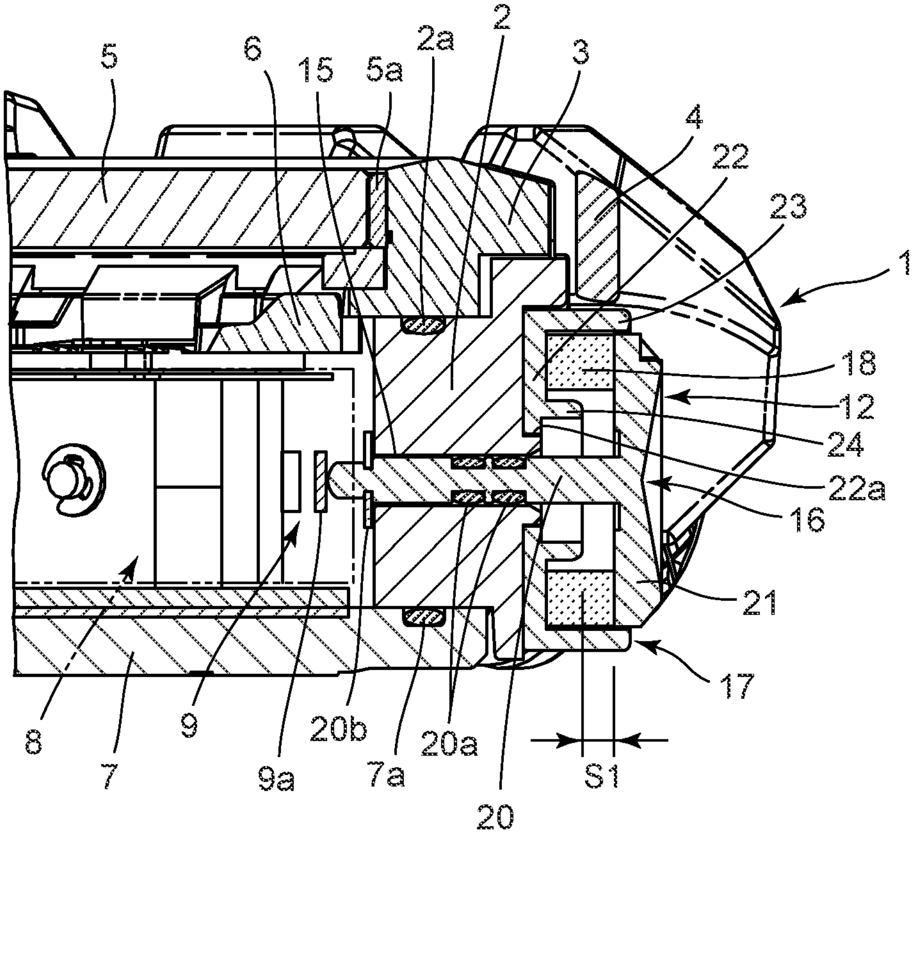
FIG. 2 is an enlarged cross-sectional view showing a first push button device of the wristwatch taken along the A-A arrow view in FIG. 1.
Figure 3:
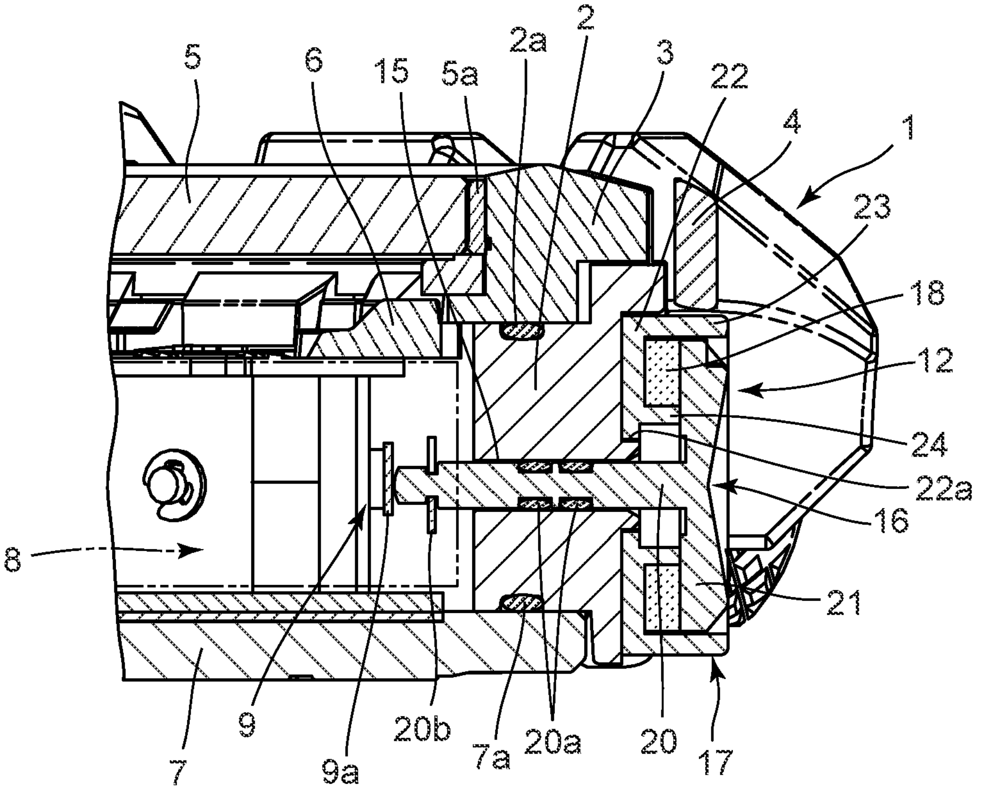
FIG. 3 is an enlarged cross-sectional view showing a state where an operation member of the first push button device shown in FIG. 2 has been pressed.

This wristwatch has a wristwatch case 1, as shown in FIG. 1 to FIG. 3. The wristwatch case 1 includes a case main body 2, an upper case 3, and an exterior member 4. The case main body 2 is made of a metal such as stainless steel or a hard synthetic resin. Also, the upper case 3 is made of a metal such as stainless steel or a hard synthetic resin, as with the case main body 2.

This wristwatch case 1 is structured such that the upper case 3 is arranged on the case main body 2 via a waterproof ring 2*a*, and attached in this state to the case main body 2 by a plurality of screw members 3*a*, as shown in FIG. 1 to FIG. 3. To the upper case 3, a watch glass 5 is attached via a packing 5*a*. Also, in the upper case 3, a projecting partition member 6 projecting toward the inner side of the upper case 3 is provided on the undersurface of the watch glass 5.

The exterior member 4 is made of synthetic resin, and arranged covering the outer circumference of the case main body 2 and the upper outer circumference of the upper case 3, as shown in FIG. 1 to FIG. 3. More specifically, this exterior member 4 includes first bezels 4*a* which are arranged on the one o'clock side, five o'clock side, seven o'clock side, and eleven o'clock side of the upper case 3, second bezels 4*b* which are arranged on later-described band attachment sections 11 provided on the twelve o'clock side and six o'clock side of the case main body 2, and third bezels 4*c* which are arranged on the three o'clock side and nine o'clock side of the case main body 2 and those of the upper case 3.

The first bezels 4*a* and the second bezels 4*b* are integrally formed by synthetic resin such that the first bezels 4*a* are connected to the sides of second bezels 4*b*, as shown in FIG. 1. As a result, the first bezels 4*a* and the second bezels 4*b* are structured such that, when the first bezels 4*a* are attached to the case main body 2 together with the upper case 3 by the plurality of screw members 3*a*, the second bezels 4*b* are attached to the band attachment sections 11. The third bezels 4*c* are arranged on side surface portions of the case main body 2 on the three o'clock side and the nine o'clock side and attached to the case main body 2 in this state by a plurality of screw members (not shown in the drawings).

To the lower part of the wristwatch case 1, that is, to the lower part of the case main body 2, a back cover 7 is attached via a waterproof packing 7*a*, as shown in FIG. 2 and FIG.

3. In this case main body 2, a timepiece module 8 is provided. Although not shown in the drawings, the timepiece module 8 has provided therein various components necessary for timepiece functions, such as a timepiece movement for driving pointers to indicate a time of day, a display section for electro-optically displaying various information regarding a time of day, a date, and the like, and a circuit section for electrically driving and controlling these components.

On the twelve o'clock side and six o'clock side of the wristwatch case 1, the band attachment sections 11 where watch bands 10 are attached are provided, as shown in FIG. 1. Also, on the two o'clock side, four o'clock side, eight o'clock side, and ten o'clock side of the wristwatch case 1, first pushbutton devices 12 are provided, respectively. Moreover, on the six o'clock side of the wristwatch case 1, a second push button device 13 is provided. Furthermore, on the three o'clock side of the wristwatch case 1, a switch device 14 such as a winder is provided.

The first push button devices 12 on the two o'clock side, four o'clock side, eight o'clock side, and ten o'clock side of the wristwatch case 1 are side switches provided on the side surface of the wristwatch case 1, and have the same structures, as shown in FIG. 1 to FIG. 3. For example, among these first push button devices 12, the first push button device 12 on the four o'clock side includes an operation member 16 which is inserted into and attached to a through hole 15 formed in a side surface portion of the case main body 2, a protection cover 17 which is a middle member and protects the operation member 16, and an elastic porous member 18 which is an elastic member and deformed in response to an operation performed on the operation member 16.

The operation member 16 includes a shaft section 20 which is slidably inserted into the through hole 15 formed in the side surface of the case main body 2, and a head section 21 provided on the outer end of the shaft section 20, as shown in FIG. 2 and FIG. 3. On the outer circumferential surface of the shaft section 20, a plurality of waterproof rings 20*a* are provided. These waterproof rings 20*a* are structured such that their outer circumferential surfaces come in pressure contact with and slide on the inner circumferential surface of the through hole 15, whereby waterproofing between the shaft section 20 and the through hole 15 is achieved.

The inner end of the shaft section 20 protrudes into the case main body 2, and a stopper member 20*b* such as an E ring is attached to this protruding inner end, as shown in FIG. 2 and FIG. 3. This stopper member 20*b* is structured to removably come in contact with the inner circumferential surface of the case main body 2. That is, the operation member 16 is structured such that, by the stopper member 20*b* coming in contact with the inner circumferential surface of the case main body 2, this operation member 16 is not slipped out from the case main body 2.

Also, the inner end of the shaft section 20 is pressed against a flat spring 9*a* of a contact switch 9 provided on the timepiece module 8 in the case main body 2, as shown in FIG. 2 and FIG. 3. As a result, the shaft section 20 is forced such that the operation member 16 is pushed toward the outside of the case main body 2 by the spring force of the flat spring 9*a* of the contact switch 9. The flat spring 9*a* is provided along the outer circumferential surface of the timepiece module 8. That is, the flat spring 9*a* is structured such that, by its length along the outer circumferential direction of the timepiece module 8 being long, sufficient spring force is ensured.

On the other hand, the head section 21 is formed in a discoid shape whose outer diameter is fairly larger than that of the shaft section 20, as shown in FIG. 2 and FIG. 3. More specifically, the outer diameter of the head section 21 is formed to be substantially equal to the vertical length (height) of the case main body 2. This head section 21 is structured such that the shaft section 20 is integrally formed on its center and, when the shaft section 20 is pushed toward the outside of the case main body 2, this head section 21 is arranged to be slightly separated from the outer surface of the case main body 2.

The protection cover 17 is a middle member arranged between the case main body 2 and the head section 21, and includes a circular section 22 which is arranged on the outer surface of the case main body 2, a guide cylindrical section (guide section) 23 which has a large diameter and is provided on the circular section 22, and a stroke restriction section 24 which has a cylindrical shape whose diameter is small and is provided on the circular section 22 so as to restrict the operation stroke S1 of the operation member 16, as shown in FIG. 2 and FIG. 3. In the center of the circular section 22, a shaft hole 22*a* whose outer diameter is slightly larger than that of the shaft section 20 is provided. The outer diameter of this circular section 22 is formed to be slightly larger than that of the head section 21.

The guide cylindrical section 23 having the large diameter is a cylindrical section whose inner diameter is substantially equal to or slightly larger than the outer diameter of the head section 21, as shown in FIG. 2 and FIG. 3. The outer diameter of the guide cylindrical section 23 is equal to the outer diameter of the circular section 22, and the axial length of the guide cylindrical section 23 is substantially equal to the slide length of the shaft section 20. This slide length of the shaft section 20 is set to be sufficiently longer than the operation stroke S1 of the operation member 16 described later The stroke restriction section 24, which is a small-diameter cylindrical section, is formed such that its outer diameter is fairly smaller than the inner diameter of the guide cylindrical section 23 and its inner diameter is slightly larger than the inner diameter of the shaft hole 22*a* which is larger than the outer diameter of the shaft section 20, as shown in FIG. 2 and FIG. 3. This stroke restriction section 24 is formed such that its axial length is substantially half the slide length of the shaft section 20.

More specifically, the stroke restriction section 24 is structured such that, when the head section 21 is pressed and the shaft section 20 is slid toward the inner side of the case main body 2, the inner surface of the head section 21 comes in contact with the outer end of this stroke restriction section 24 on the outer side of the case main body 2, as shown in FIG. 2 and FIG. 3. That is, the stroke restriction section 24 is structured to restrict the slide length of the head section 21 of the operation member 16 and thereby set the operating stroke S1 of the head section 21.

The elastic porous member 18 is formed in a circular ring shape (For example, thickness: 2.0 mm or more, outer shape: 8.2(φ), inner diameter: 5.1(φ)), and structured to be arranged between the large-diameter guide cylindrical section 23 of the protection cover 17 and the small-diameter stroke restriction section 24, as shown in FIG. 2 and FIG. 3. This elastic porous member 18 is acquired by a large number of air bubbles being formed in an elastic material, such as silicone rubber, urethane rubber, and elastomer. Also, in the case of this elastic porous member 18, for example, the density is 270 kg/mm3±5%, the 25% compressive load is 0.056 MPa±5%, and the compression residual strain is 5.0±5%.

That is, this elastic porous member 18 is a sponge-like material acquired by an elastic material being foamed with a foaming agent and a number of air bubbles being formed in the elastic material. As this elastic material, a highly durable silicone rubber is desirable. Also, at least some of the air bubbles formed in the elastic material should preferably be connected holes. However, they may be unconnected holes.

Also, this elastic porous member 18 is formed such that its length in the axial direction of the operation member 16 is longer than the operation stroke S1 of the head section 21 of the operation member 16, and substantially equal to the slide length of the shaft section 20, as shown in FIG. 2 and FIG. 3. That is, this elastic porous member 18 is deformed and contracted in its initial state where it is arranged between the head section 21 and the circular section 22 of the protection cover 17 and between the large-diameter guide cylindrical section 23 and the stroke restriction section 24 which is a small-diameter cylindrical section.

Also, this elastic porous member 18 is structured such that, when the head section 21 of the operation member 16 is pressed, this elastic porous member 18 is hardly deformed in a radial direction (a direction intersecting with the movement direction of the operation member 16), and is further deformed and contracted in response to the press operation performed on the head section 21, as shown in FIG. 2 and FIG. 3. That is, this elastic porous member 18 is structured such that its length in the axial direction of the operation member 16 in a natural free state where no load has been applied is substantially equal to the slide length of the shaft section 20. Also, this elastic porous member 18 in its initial state may be in contact with the inner surface of the large-diameter guide cylindrical section 23 which is adjacent thereto in a radial direction. By the operation member 16 being operated (moved) in this state, the elastic porous member 18 can be contracted with almost no radial deformation. As a result of this structure, a space for the radial deformation (expansion) of the elastic porous member 18 is not required to be provided around the elastic porous member 18. Accordingly, downsizing of the wristwatch case 1 can be achieved. In addition, the entering of foreign substances such as mud or sand consisting of small particles into an area between the elastic porous member 18 and the inner surface of the large-diameter guide cylindrical section 23 can be suppressed.

Accordingly, the elastic porous member 18 is structured to be slightly deformed and contracted when arranged between the head section 21 and the circular section 22 of the protection cover 17 in the initial state, as shown in FIG. 2 and FIG. 3. Also, the elastic porous member 18 is structured such that, when the head section 21 of the operation member 16 is pressed against the spring force of the flat spring **9*a* of the contact switch 9 and the shaft section 20 is slid toward the inner side of the case main body 2, this elastic porous member 18 is pressed by the head section 21** and further deformed and contracted.

That is, the elastic porous member 18 is structured such that its radial size in the initial state is substantially equal to its radial size when the head section 21 is pressed, as shown in FIG. 2 and FIG. 3. As a result, the elastic porous member 18 is structured such that repulsion force when this elastic porous member 18 is pressed by the head section 21 and deformed and contracted is hardly applied to the head section 21.

Also, the elastic porous member 18 is structured such that, when the head section 21 of the operation member 16 is pressed against the spring force of the flat spring **9*a* of the contact switch 9 and this elastic porous member 18 is further deformed and contracted, a number of air bubbles provided in the elastic material of this elastic porous member 18 are crushed and deformed, as shown in FIG. 2 and FIG. 3. As a result, the elastic porous member 18 is structured such that, by a number of air bubbles being crushed and deformed, foreign substances such as mud or sand consisting of small particles which have entered into the air bubbles are discharged, whereby clogging due to the foreign substances can be prevented. When the elastic porous member 18 is in the initial state by being slightly deformed and contracted so as to be arranged, at least some of the air bubbles may be in an almost crushed state. By the elastic porous member 18 being pressed by the head section 21** in this state and further deformed and contracted, the entering of foreign substances such as mud or sand into the air bubbles can be prevented.

Furthermore, the elastic porous member 18 is structured such that, when the shaft section 20 of the operation member 16 is pressed by the spring force of the flat spring **9*a* of the contact switch 9, and the shaft section 20 is slid toward the outside of the case main body 2 so that the head section 21 returns to its initial position, this elastic porous member 18 is slowly restored to its original shape in a manner to follow or with a slight delay to the return movement of the head section 21, as shown in FIG. 2 and FIG. 3. That is, the elastic porous member 18 is structured such that its restoring force or repulsion force in the initial state before the operation member 16 is operated and those in the operation state after the operation member 16** is operated are substantially the same.

Still further, the elastic porous member 18 is structured such that, when the shaft section 20 of the operation member 16 is pressed by the spring force of the flat spring **9*a* of the contact switch 9, and the elastic porous member 18 is slowly restored to its original shape as the head section 21 is pressed toward the outside of the case main body 2, the air bubbles also deform and expand to slowly swell to their original shapes, as shown in FIG. 2 and FIG. 3**.

As a result, the elastic porous member 18 is structured such that, when the air bubbles are deforming and expanding to slowly swell, foreign substances such as mud or sand consisting of large particles among foreign substances such as mud or sand which have entered into an area between the head section 21 and the protection cover 17 can be prevented from entering the air bubbles although foreign substances such as mud or sand consisting of small particles may enter the air bubbles, as shown in FIG. 2 and FIG. 3.

Next, the mechanism of this first push button device 12 of the wristwatch is described.

In this first push button device 12, normally, the shaft section 20 of the operation member 16 has been pressed toward the outside of the case main body 2 by the spring force of the flat spring **9*a* of the contact switch 9 on the timepiece module 8 provided in the case main body 2. Here, the stopper member 20*b* provided on the inner end of the shaft section 20 is in contact with the inner circumferential surface of the case main body 2, so that the operation member 16 which is being pressed outward is not slipped out from the case main body 2**.

In this state, the head section 21 of the operation member 16 has been pressed toward the outside of the case main body 2 from inside the large-diameter guide cylindrical section 23 of the protection cover 17, as shown in FIG. 2. Accordingly, the elastic porous member 18 is in its initial shape, or in other words, a slightly deformed and contracted shape, and is positioned between the head section 21 and the circular section 22 of the protection cover 17 and between the large-diameter guide cylindrical section 23 and the stroke restriction section 24 of the small-diameter cylinder section. As a result, the elastic porous member 18 has been surrounded by these sections. Here, the flat spring 9*a* is away from the contact switch 9 and therefore the contact switch 9 is in the off state Then, when the head section 21 of the operation member 16 is pressed against the spring force of the flat spring 9*a* of the contact switch 9, the shaft section 20 of the operation member 16 is slid toward the inner side of case main body 2. Here, the elastic porous member 18 is pressed by the head section 21 and thereby deformed and contracted. During this period in which the elastic porous member 18 is pressed by the head section 21 and deformed and contracted from its initial shape, the repulsion force of the elastic porous member 18 is hardly applied to the head section 21.

Also, when the elastic porous member 18 is to be deformed and contracted by the head section 21 of the operation member 16 being pressed, this elastic porous member 18 is not deformed to be stretched in radial directions but is deformed such that a number of air bubbles provided in the elastic material are crushed. By this crush, foreign substances such as mud or sand consisting of small particles which have entered into the air bubbles are discharged, whereby clogging due to the foreign substances such as mud or sand in the air bubbles can be prevented. As a result, the shaft section 20 of the operation member 16 is smoothly slid.

Then, when the inner surface of the head section 21 comes in contact with the stroke restriction section 24 of the protection cover 17, the pressing operation on the head section 21 is stopped. Here, the stopper member 20*b* provided on the inner end of the shaft section 20 is separated from the inner circumferential surface of the case main body 2 toward the inner side of the case main body 2, and the inner end of the shaft section 20 resiliently deforms the flat spring 9*a* of the contact switch 9 so as to turn on the contact switch 9.

In this state, when the pressing operation on the head section 21 is released, the shaft section 20 is pressed outward by the spring force of the flat spring 9*a* of the contact switch 9, and the head section 21 is slid in a direction to return to its initial position. Here, since the elastic porous member 18 has the structure where its restoring force in the initial state and that in the operation state after the operation member 16 is operated are substantially the same, this elastic porous member 18 is slowly restored to its original shape in a manner to follow or with a slight delay to the return movement of the head section 21.

When the elastic porous member 18 is slowly restored to its original shape as described above, the air bubbles provided in the elastic material of the elastic porous member 18 deform and expand to slowly swell to their original shapes. Here, among foreign substances such as mud or sand which have entered into an area between the head section 21 and the protection cover 17, foreign substances such as mud or sand consisting of large particles can be prevented from entering the air bubbles although foreign substances such as mud or sand consisting of small particles may enter the air bubbles. In addition, when the elastic porous member 18 is being restored to its original shape, the operation member 16 is smoothly slid and pressed outward. As a result, the flat spring 9*a* is separated from the contact switch 9, whereby the contact switch 9 is turned off.

As described above, this first push button device 12 of the wristwatch includes the case main body 2 which is a supporting member provided with the through hole 15, the operation member 16 having the shaft section 20 slidably inserted into the through hole 15 and the head section 21 provided on the outer end of the shaft section 20, and the elastic porous member 18 which is an elastic member that is deformed and contracted to be arranged between the head section 21 and the case main body 2, and further deformed and contracted in response to an operation performed on the operation member 16. As a result of this structure, the entering of foreign substances such as mud and sand can be suppressed.

That is, in this first push button device 12 of the wristwatch, the elastic porous member 18 is deformed and contracted to be arranged between the head section 21 and the case main body 2, and further deformed and contracted in response to an operation performed on the operation member 16, whereby the entering of foreign substances such as mud and sand from the outside of the head section 21 to the inside can be suppressed.

Also, in the case of this first push button device 12 of the wristwatch, the elastic porous member 18 is structured by an elastic material being foamed and a number of air bubbles being formed in the elastic material, and its restoring force in the initial state before the operation member 16 is operated and that in the operation state after the operation member 16 is operated are substantially the same. As a result of this structure, even when the elastic porous member 18 is deformed to be contracted or expanded in response to an operation on the operation member 16, the operation force of the operation member 16 is not affected thereby, which enhances the operability of the operation member 16.

That is, in the case of this first push button device 12, by having the structure where a number of air bubbles are formed in an elastic material, the elastic porous member 18 can have a spongy-like form. Accordingly, even when the elastic porous member 18 is deformed to be contracted or expanded in response to an operation on the operation member 16, the operation force of the operation member 16 is not affected thereby, and the elastic porous member 18 is slowly restored to its original shape in a manner to follow or with a slight delay to the return movement of the head section 21.

Also, in the case of this first push button device 12, when the elastic porous member 18 is to be deformed and contracted by the head section 21 of the operation member 16 being pressed, this elastic porous member 18 is deformed such that a number of air bubbles provided in the elastic material are crushed, whereby foreign substances such as mud or sand consisting of small particles which have entered into the air bubbles are discharged. As a result of this structure, clogging due to the foreign substances such as mud or sand in the air bubbles can be prevented, whereby the shaft section 20 of the operation member 16 is smoothly slid.

Moreover, in the case of this first push button device 12, when the elastic porous member 18 is being slowly restored to its original shape, a number of air bubbles provided in the elastic material of the elastic porous member 18 deform and expand to slowly swell to their original shapes. As a result, among foreign substances such as mud or sand which have entered into an area between the head section 21 and the protection cover 17, foreign substances such as mud or sand consisting of large particles can be favorably prevented from entering into the air bubbles although foreign substances such as mud or sand consisting of small particles may enter the air bubbles. As a result of this structure, the durability of the elastic porous member 18 and the operability of the operation member 16 can be enhanced.

Furthermore, in the case of this first push button device 12, the length of the elastic porous member 18 in the operation direction of the operation member 16 is longer than the operation stroke S1 of the operation member 16, whereby the elastic porous member 18 can be deformed and contracted in its initial state so as to be arranged between the head section 21 and the case main body 2, and can be further deformed and contracted in response to an operation performed on the operation member 16. As a result of this structure, by the elastic porous member 18, the entering of foreign substances such as mud and sand can be reliably and favorably suppressed.

Still further, this first push button device 12 includes the stroke restriction section 24 which restricts the operation stroke S1 of the operation member 16. Accordingly, by this stroke restriction section 24, the operation stroke S1 of the operation member 16 can be precisely and favorably set, whereby the contraction and expansion deformation of the elastic porous member 18 can be kept constant, and the elastic porous member 18 can be precisely and favorably deformed to be contracted or expanded.

Yet still further, in this first push button device 12, the stroke restriction section 24 is provided on the protection cover 17 which is a middle member provided between the case main body 2 and the head section 21 and, by this stroke restriction section 24 provided on the protection cover 17, the movement length of the head section 21 of the operation member 16 in the axial direction when the head section 21 is pressed can be precisely restricted.

Yet still further, in this first push button device 12, in an area between the head section 21 and the case main body 2, the elastic porous member 18 is arranged almost all over the area excluding the stroke restriction section 24. As a result of this structure, the entire volume of the elastic porous member 18 is large, and the entering of foreign substances such as mud and sand can be significantly suppressed by this elastic porous member 18.

Yet still further, this first push button device 12 includes the flat spring 9*a* of the contact switch 9 which is an energizing member that forces the operation member 16 toward the outside of the case main body 2. By this flat spring 9*a* coming in contact with the inner end of the shaft section 20, the head section 21 of the operation member 16 is unfailingly pressed toward the outside of the case main body 2 by the spring force of the flat spring 9*a*. As a result of this structure, no coil spring (not shown) is required to be provided on an outer circumferential portion of the shaft section 20 on the inner side of the head section 21, which reduces the number of necessary components, and reduction in the operability of the operation member 16 due to the deterioration of a coil spring by the entering of foreign substances such as mud and sand can be prevented.

In the above-described first embodiment, the operation member 16 is forced toward the outside of the case main body 2 only by the flat spring 9*a* of the contact switch 9. However, the present invention is not limited thereto. For example, a structure may be adopted in which a coil spring is provided on an outer circumferential portion of the shaft section 20 on the inner side of the head section 21, that is, a coil spring is provided on the inner diameter side of the elastic porous member 18, and the operation member 16 is forced toward the outside of the case main body 2 by the spring force of this coil spring.

Also, the above-described first embodiment includes the protection cover 17 which is a middle member. However, the present invention is not necessary required to have the protection cover 17. In addition, the present invention is not necessary required to have the guide cylindrical section 23 of the protection cover 17. In those structures, it is only required that the stroke restriction section 24 is provided on either the outer surface of the case main body 2 or the inner surface of the head section 21.

Second Embodiment

Next, a second embodiment where the present invention has been applied in a wristwatch will hereinafter be described with reference to FIG. 4 to FIG. 6. Sections that are the same as those of the first embodiment shown in FIG. 1 to FIG. 3 are provided with the same reference numerals.

Figure 4:
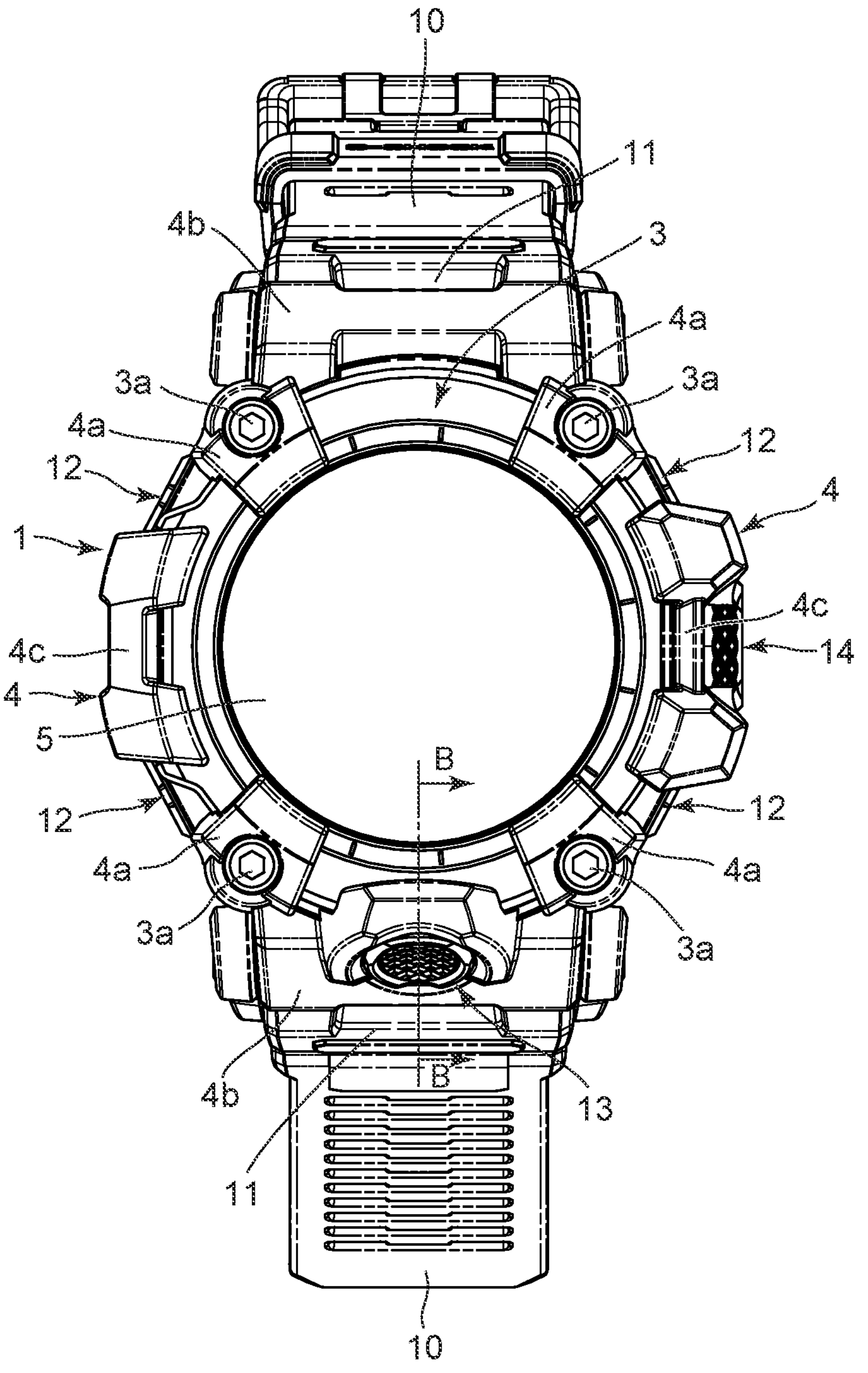
FIG. 4 is an enlarged front view showing a second embodiment where the present invention has been applied in a wristwatch.

As in the case of the first embodiment, this wristwatch case 1 includes the first push button devices 12, the second push button device 13, and the switch device 14, as shown in FIG. 4.

Also, as with the first embodiment, the first push button devices 12 are provided on the two o'clock-side, four o'clock side, eight o'clock side, and ten o'clock side of the wristwatch case 1, as shown in FIG. 4. In addition, as with the first embodiment, the second push button device 13 is provided on the six o'clock side of the wristwatch case 1, and the switch device 14 is provided on the three o'clock side of the wristwatch case 1.

Figure 5:
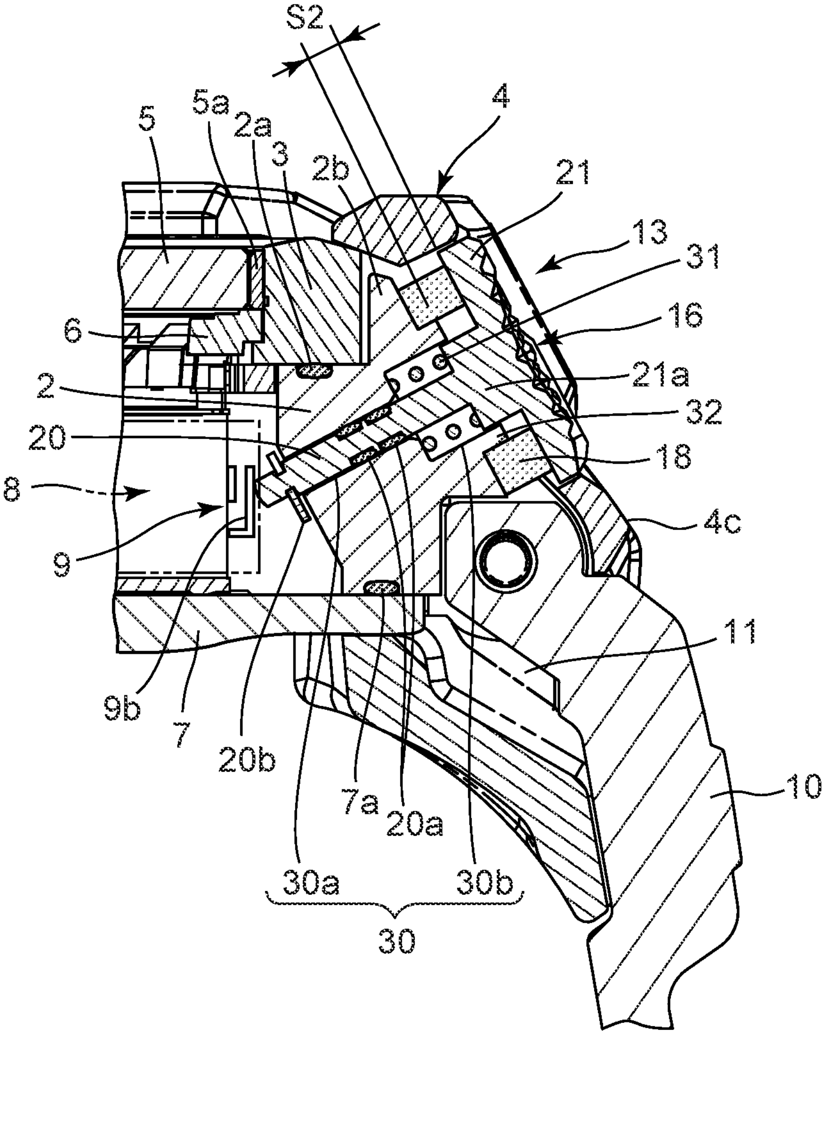
FIG. 5 is an enlarged cross-sectional view showing a second push button device of the wristwatch taken along the B-B arrow view in FIG. 4.
Figure 6:
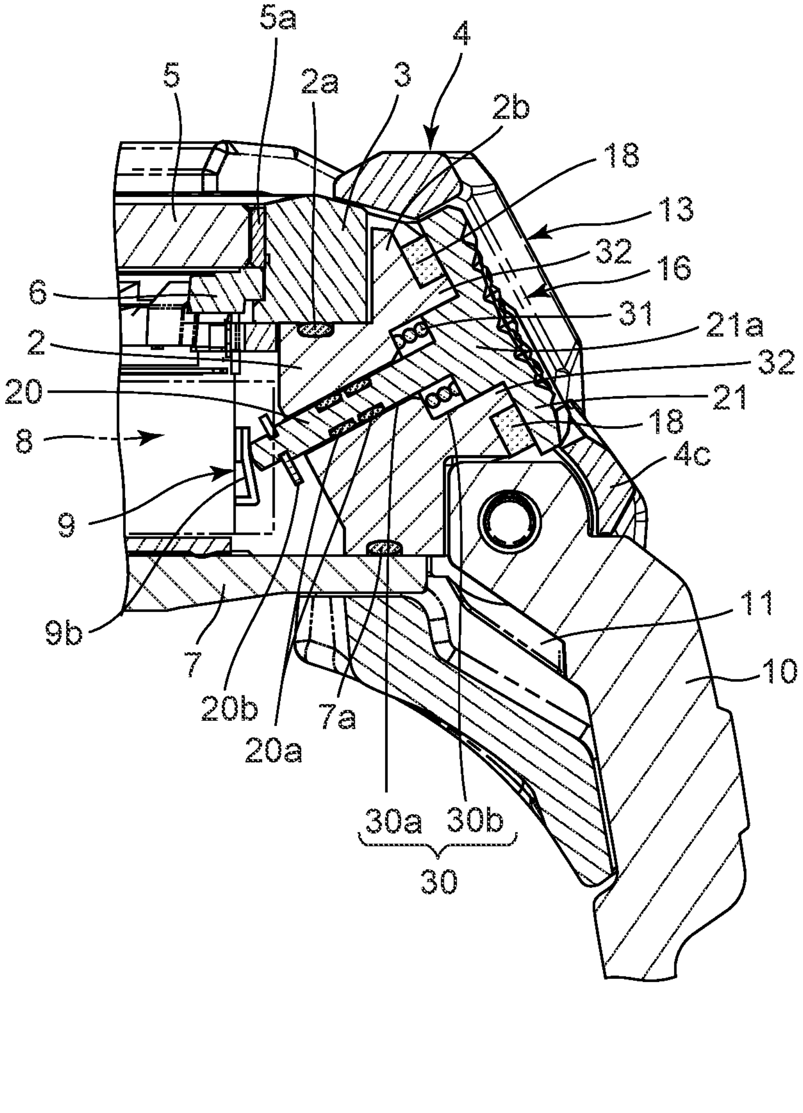
FIG. 6 is an enlarged cross-sectional view showing a state where an operation member of the second push button device shown in FIG. 5 has been pressed.

The second push button device 13 provided on the six o'clock side of the wristwatch case 1 is an upwardly oriented switch, as shown in FIG. 4 to FIG. 6. More specifically, this second push button device 13 includes an operation member 16 which is inserted into a through hole 30 formed at a tilt in the side surface of the case main body 2 on the six o'clock side, and obliquely attached thereto, a coil spring 31 which is an energizing member that forces the inclined operation member 16 toward the outside of the case main body 2, and the elastic porous member 18 which is deformed in response to an operation performed on the operation member 16.

In an area above the band attachment section 11 on the side portion of the case main body 2 on the six o'clock side, an inclined section 2*b* is provided to project outward, as shown in FIG. 5 and FIG. 6. The through hole 30 includes a small-diameter hole section 30*a* and a large-diameter hole section 30*b*, and these sections are obliquely and upwardly formed at an inclination angle of about 30 degrees toward the outer surface of the inclined section 2*b* from the inner circumferential surface of the case main body 2.

As in the case of the first embodiment, the operation member 16 includes the shaft section 20 which is slidably inserted into the through hole 30 in the case main body 2, and the head section 21 provided on the outer end of the shaft section 20, as shown in FIG. 5 and FIG. 6. The shaft section 20 is formed such that its axial length is long enough to be arranged in the small-diameter hole section 30*a* and large-diameter hole section 30*b* of the through hole 30.

The shaft section 20 is structured to be inserted into the through hole 30 and obliquely slid, as shown in FIG. 5 and FIG. 6. Except for this structure, it is substantially the same as that of the first embodiment. More specifically, the inner end of the shaft section 20 is pressed against a contact plate 9*b* of the contact switch 9 provided on the timepiece module 8 in the case main body 2. The contact plate 9*b* is structured to be provided vertically upright on the outer circumferential surface of the timepiece module 8, and attachable to and separable from the contact section of the contact switch 9 so as to turn on and off the contact switch 9.

The head section 21 is formed in a discoid shape whose outer diameter is sufficiently larger than that of the shaft section 20, as shown in FIG. 5 and FIG. 6. That is, this head section 21 is formed such that its outer diameter is substantially equal to the length of the inclined surface, that is, the outer surface of the inclined section 2*b* of the case main body 2. This head section 21 is inclined in parallel with the inclined surface, that is, the outer surface of the inclined section 2*b* of the case main body 2, and the center of the head section 21 is provided with a pedestal section 21*a* integrally formed with the shaft section 20.

The pedestal section 21*a* is formed such that its outer diameter is substantially equal to the inner diameter of the large-diameter hole section 30*b* of the through hole 30, as shown in FIG. 5 and FIG. 6. Also, this pedestal section 21*a* is formed such that its axial length is about half the axial length of the large-diameter hole section 30*b* of the through hole 30. As a result, this pedestal section 21*a* is structured to slide in an inclined state in the large-diameter hole section 30*b* of the through hole 30.

For the head section 21, an operation stroke S2 is set by a stroke restriction section 32 provided on the inclined surface of the inclined section 2*b* of the case main body 2, as shown in FIG. 5 and FIG. 6. More specifically, the stroke restriction section 32 is a cylindrical section provided on the inclined section 2*b* of the case main body 2, and its inner diameter is equal to the inner diameter of the large-diameter hole section 30*b* of the through hole 30. The axial length of this stroke restriction section 32 is slightly shorter than the axial length of the pedestal section 21*a* of the head section 21.

The operation member 16 is structured such that, when it is pushed toward the outside of the case main body 2, the inner surface of the head section 21 is separated from the stroke restriction section 32 with a part of the inner end of the pedestal section 21*a* being arranged in the large-diameter hole section 30*b* of the through hole 30, and the head section 21 is arranged projecting outside the inclined section 2*b* of the case main body 2, as shown in FIG. 5. Also, this operation member 16 is structured such that, when it is pressed toward the inner side of the case main body 2, the pedestal section 21*a* is inserted into the large-diameter hole section 30*b* of the through hole 30, and the inner surface of the head section 21 comes in contact with the outer end surface of the stroke restriction section 32, as shown in FIG. 6.

On the other hand, the coil spring 31, which forces the operation member 16 toward the outside of the case main body 2, is arranged in the large-diameter hole section 30*b* of the through hole 30, as shown in FIG. 5 and FIG. 6. More specifically, the coil spring 31 is structured such that its one end comes in contact with the inner end surface of the large-diameter hole section 30*b*, the other end comes in contact with the inner end surface of the pedestal section 21*a* of the head section 21, and this coil spring 31 in this state forces the head section 21 toward the outside of the case main body 2.

As in the case of the first embodiment, the elastic porous member 18 is formed in a substantially circular ring shape, and arranged between the inclined surface of the inclined section 2*b* of the case main body 2 and the inner surface of the head section 21 with the cylindrical stroke restriction section 32 being inserted into the inside of this elastic porous member 18, as shown in FIG. 5 and FIG. 6. This elastic porous member 18 is a sponge-like material acquired by an elastic material being foamed with a foaming agent and a number of air bubbles being formed in the elastic material, as with the first embodiment.

Also, as in the case of the first embodiment, this elastic porous member 18 is formed such that its length in the axial direction of the operation member 16 is longer than the operation stroke S2 of the head section 21 of the operation member 16, and substantially equal to the slide length of the shaft section 20, as shown in FIG. 5 and FIG. 6. As a result, this elastic porous member 18 is slightly deformed and contracted in the initial state where it is arranged between the head section 21 and the inclined section 2*b* of the case main body 2. When the head section 21 of the operation member 16 is pressed, this elastic porous member 18 is hardly deformed in radial directions, and is further deformed and contracted in response to the press operation performed on the head section 21, That is, this elastic porous member 18 is structured such that its length in the axial direction of the operation member 16 in a natural free state where no load has been applied is substantially equal to the slide length of the shaft section 20, as shown in FIG. 5 and FIG. 6. As a result, this elastic porous member 18 is structured to be slightly deformed and contracted in the initial state where it is arranged between the head section 21 and the inclined section 2*b* of the case main body 2.

Also, as in the case of the first embodiment, this elastic porous member 18 is structured such that, when the head section 21 of the operation member 16 is pressed against the spring force of the coil spring 31 and the shaft section 20 is slid toward the inner side of the case main body 2, this elastic porous member 18 is further deformed and contracted by the head section 21, as shown in FIG. 5 and FIG. 6.

That is, this elastic porous member 18 has the structure where its size in radial directions in the initial state and its size in the radial directions when the head section 21 is pressed are substantially the same, as shown in FIG. 5 and FIG. 6. As a result, the elastic porous member 18 is structured such that repulsion force when this elastic porous member 18 is pressed by the head section 21 and further deformed and contracted is hardly applied to the head section 21.

Also, this elastic porous member 18 is structured such that, when the head section 21 of the operation member 16 is pressed against the spring force of coil spring 31 and this elastic porous member 18 is further deformed and contracted, a number of air bubbles provided in the elastic material of this elastic porous member 18 are crushed and deformed, as shown in FIG. 5 and FIG. 6. As a result, this elastic porous member 18 is structured such that, by a number of air bubbles being crushed and deformed, foreign substances such as mud or sand consisting of small particles which have entered into the air bubbles are discharged, whereby clogging due to the foreign substances in the air bubbles can be prevented.

Moreover, this elastic porous member 18 is structured such that, when the head section 21 of the operation member 16 is pressed by the spring force of the coil spring 31, and the shaft section 20 is slid toward the outside of the case main body 2 so that the head section 21 returns to its initial position, this elastic porous member 18 is restored to its original shape in a manner to follow or with a slight delay to the return movement of the head section 21, as shown in FIG. 5 and FIG. 6. That is, this elastic porous member 18 is structured such that its restoring force or repulsion force in the initial state before the operation member 16 is operated and those in the operation state after the operation member 16 is operated are substantially the same.

Furthermore, this elastic porous member 18 is structured such that, when the head section 21 of the operation member 16 is pressed by the spring force of coil spring 31, and this elastic porous member 18 is slowly restored to its original shape, the air bubbles also deform and expand to slowly swell to their original shapes, as shown in FIG. 5 and FIG. 6.

As a result, the elastic porous member 18 is structured such that, when the air bubbles are deforming and expanding to slowly swell, foreign substances such as mud or sand consisting of large particles among foreign substances such as mud or sand which have entered into an area between the head section 21 and the inclined section 2*b* of the case main body 2 can be prevented from entering the air bubbles although foreign substances such as mud or sand consisting of small particles may slowly enter the air bubbles, as shown in FIG. 5 and FIG. 6.

Next, the mechanism of this second push button device 13 of the wristwatch is described.

In this second push button device 13, normally, the head section 21 of the operation member 16 has been pressed outside the case main body 2 by the spring force of the coil spring 31. Here, the stopper member 20*b* provided on the inner end of the shaft section 20 is in contact with the inner circumferential surface of the case main body 2, so that the operation member 16 which is being pressed outward is not slipped out from the case main body 2.

In this state, the head section 21 of the operation member 16 has been pressed in an inclined state toward the outside of the inclined section 2*b* of the case main body 2, as shown in FIG. 5. Accordingly, the elastic porous member 18 is in its initial shape, or in other words, a slightly deformed and contracted shape, and is positioned between the head section 21 and the inclined section 2*b* of the case main body 2. Here, the contact plate 9*b* of the contact switch 9 is away from the contact section of the contact switch 9 and therefore the contact switch 9 is in the off state.

Then, when the head section 21 of the operation member 16 is pressed against the spring force of the coil spring 31, the shaft section 20 of the operation member 16 is slid in an inclined state toward the inner side of case main body 2. Here, the elastic porous member 18 is pressed by the head section 21 and thereby deformed and contracted. During this period in which the elastic porous member 18 is pressed by the head section 21 and further deformed and contracted from its initial shape, the repulsion force of the elastic porous member 18 is hardly applied to the head section 21, as in the case of the first embodiment.

Also, when the elastic porous member 18 is to be deformed and contracted by the head section 21 of the operation member 16 being pressed, this elastic porous member 18 is not deformed to be stretched in radial directions but is deformed such that a number of air bubbles provided in the elastic material are crushed, as in the case of the first embodiment. By this crush, foreign substances such as mud or sand consisting of small particles which have entered into the air bubbles are discharged, whereby clogging due to the foreign substances such as mud or sand in the air bubbles can be prevented. As a result, the shaft section 20 of the operation member 16 is smoothly slid.

Then, when the inner surface of the head section 21 comes in contact with the stroke restriction section 32 provided on the inclined section 2*b* of the case main body 2, the pressing operation on the head section 21 is stopped. Here, the stopper member 20*b* provided on the inner end of the shaft section 20 is separated from the inner circumferential surface of the case main body 2 toward the inner side of the case main body 2, and the inner end of the shaft section 20 is pressed against the contact plate 9*b* of the contact switch 9, whereby the contact switch 9 is turned on.

In this state, when the pressing operation on the head section 21 is released, the head section 21 is pressed outward in an inclined state by the spring force of the coil spring 31, and slid in the inclined state in a direction to return to its initial position. Here, since the elastic porous member 18 has the structure where its restoring force in the initial state and that in the operation state after the operation member 16 is operated are substantially the same, this elastic porous member 18 is slowly restored to its original shape in a manner to follow or with a slight delay to the return movement of the head section 21.

When the elastic porous member 18 is slowly restored to its original shape as described above, the air bubbles provided in the elastic material of the elastic porous member 18 deform and expand to slowly swell to their original shapes, as in the case of the first embodiment. Here, among foreign substances such as mud or sand which have entered into an area between the head section 21 and the inclined section 2*b* of the case main body 2, foreign substances such as mud or sand consisting of large particles can be prevented from entering the air bubbles although foreign substances such as mud or sand consisting of small particles may enter the air bubbles. In addition, when the elastic porous member 18 is being restored to its original shape, the operation member 16 is smoothly slid and pressed outward. As a result, the contact plate 9*b* is separated from the contact section of the contact switch 9, whereby the contact switch 9 is turned off.

As described above, this second push button device 13 of the wristwatch includes the case main body 2 which is a supporting member and in which the through hole 30 is obliquely formed, the operation member 16 having the shaft section 20 slidably and obliquely inserted into the through hole 30 and the head section 21 provided on the outer end of the shaft section 20, and the elastic porous member 18 which is an elastic member that is deformed and contracted to be arranged between the head section 21 and the inclined section 2*b* of the case main body 2, and further deformed and contracted in response to an operation performed on the operation member 16. As a result of this structure, the entering of foreign substances such as mud and sand can be suppressed, as with the first embodiment.

That is, in this second push button device 13 of the wristwatch, the elastic porous member 18 is deformed and contracted to be arranged between the head section 21 and the inclined section 2*b* of the case main body 2, and further deformed and contracted in response to an operation performed on the operation member 16, whereby the entering of foreign substances such as mud and sand into an area between the head section 21 and the inclined section 2*b* of the case main body 2 can be suppressed, as with the first embodiment.

Also, in the case of this second push button device 13 of the wristwatch, the elastic porous member 18 is structured by an elastic material being foamed and a number of air bubbles being formed in the elastic material, and its restoring force in the initial state before the operation member 16 is operated and that in the operation state after the operation member 16 is operated are substantially the same. As a result of this structure, even when the elastic porous member 18 is deformed to be contracted or expanded in response to an operation on the operation member 16, the operation force of the operation member 16 is not affected thereby, which enhances the operability of the operation member 16, as with the first embodiment.

That is, in the case of this second push button device 13, by having the structure where a number of air bubbles are formed in an elastic material, the elastic porous member 18 can have a spongy-like form. Accordingly, even when the elastic porous member 18 is deformed to be contracted or expanded in response to an operation on the operation member 16, the operation force of the operation member 16 is not affected thereby, and the elastic porous member 18 is slowly restored to its original shape in a manner to follow or with a slight delay to the return movement of the head section 21, as with the first embodiment.

Accordingly, in the case of this second push button device 13, when the elastic porous member 18 is to be deformed and contracted by the head section 21 of the operation member 16 being pressed, a number of air bubbles provided in the elastic material of the elastic porous member 18 are crushed and deformed, whereby foreign substances such as mud or sand consisting of small particles which have entered into the air bubbles are discharged, as with the first embodiment. As a result of this structure, clogging due to the foreign substances such as mud or sand in the air bubbles can be prevented, whereby the shaft section 20 of the operation member 16 is smoothly slid.

Also, in the case of this second push button device 13, when the elastic porous member 18 is being slowly restored to its original shape, a number of air bubbles provided in the elastic material of the elastic porous member 18 deform and expand to slowly swell to their original shapes. As a result, among foreign substances such as mud or sand which have entered into an area between the head section 21 and the inclined section 2*b* of the case main body 2, foreign substances such as mud or sand consisting of large particles can be prevented from entering into the air bubbles although foreign substances such as mud or sand consisting of small particles may enter the air bubbles, as with the first embodiment. As a result of this structure, the durability of the elastic porous member 18 and the operability of the operation member 16 can be enhanced.

Moreover, in the case of this second push button device 13, the length of the elastic porous member 18 in the operation direction of the operation member 16 is longer than the operation stroke S2 of the operation member 16, whereby the elastic porous member 18 can be deformed and contracted in its initial state so as to be arranged between the head section 21 and the inclined section 2*b* of the case main body 2, and can be further deformed and contracted in response to an operation performed on the operation member 16. As a result of this structure, by the elastic porous member 18, the entering of foreign substances such as mud and sand can be reliably and favorably suppressed.

Furthermore, this second push button device 13 includes the stroke restriction section 32 which restricts the operation stroke S2 of the operation member 16. Accordingly, by this stroke restriction section 32, the operation stroke S2 of the operation member 16 can be precisely and favorably set, whereby the contraction and expansion deformation of the elastic porous member 18 can be kept constant, and the elastic porous member 18 can be precisely and favorably deformed to be contracted or expanded.

Still further, in this second push button device 13, the stroke restriction section 32 is provided on the outer surface of the inclined section 2*b* of the case main body 2. By this stroke restriction section 32, the movement length of the head section 21 of the operation member 16 in the axial direction when the head section 21 is pressed can be precisely restricted, and the number of required components can be reduced since the protection cover 17 which is a middle member used in the first embodiment is not necessary.

Yet still further, in this second push button device 13, in an area between the head section 21 and the case main body 2, the elastic porous member 18 is arranged almost all over the area excluding the stroke restriction section 32. As a result of this structure, the entire volume of the elastic porous member 18 is large, and the entering of foreign substances such as mud and sand can be significantly suppressed by this elastic porous member 18, as with the first embodiment.

Yet still further, this second push button device 13 includes the coil spring 31 which is an energizing member that obliquely forces the operation member 16 toward the outside of the case main body 2. By the spring force of this coil spring 31, the head section 21 of the operation member 16 can be reliably pushed toward the outside of the case main body 2. By this structure, even if the spring force of the contact plate 9*b* of the contact switch 9 is weak and sufficient spring force cannot be acquired thereby, sufficient spring force can be acquired by the coil spring 31.

Yet still further, in this second push button device 13, the coil spring 31 is arranged in the large-diameter hole section 30*b* of the through hole 30 obliquely formed in the case main body 2, and the elastic porous member 18 is arranged on the outer circumference side of the coil spring 31. Accordingly, by the elastic porous member 18, the entering of foreign substances such as mud or sand into the coil spring 31 can be suppressed. As a result of this structure, although the coil spring 31 is being used, the deterioration of the coil spring 31 due to the entering of foreign substances such as mud and sand can be prevented.

In the above-described second embodiment, the stroke restriction section 32 is provided on the outer surface of the inclined section 2*b* of the case main body 2. However, the present invention is not limited thereto. For example, a structure may be adopted in which the stroke restriction section 32 is provided on the inner surface of the head section 21.

Also, in the above-described first and second embodiments, the present invention has been applied in a wristwatch. However, the present invention is not necessarily required to be applied in a wristwatch. For example, the present invention is applicable to various types of timepieces such as a travel watch, an alarm clock, a table clock, and a wall clock. Furthermore, the present invention is not necessarily required to be applied in timepieces, and can be applied in electronic devices such as a portable telephone and a portable terminal device.

While the present invention has been described with reference to the preferred embodiments, it is intended that the invention be not limited by any of the details of the description therein but includes all the embodiments which fall within the scope of the appended claims.

What is claimed is:

1. A push button device comprising:

a supporting member provided with a through hole;

an operation member having a shaft slidably inserted into the through hole, and a head provided on an outer end of the shaft;

an energizing member which is a flat spring of a contact switch that is pressed against an end of the shaft and forces the operation member toward an outside of the supporting member; and an elastic member which has a plurality of air bubbles and is contracted to be arranged between the head and the supporting member, and further contracted in response to a movement of the operation member, wherein, when a pressing operation is released from a state where the pressing operation is performed, the operation member is returned by an energizing force by the energizing member to a state where no pressing operation is performed.

2. The push button device according to claim 1, wherein the energizing member is a coil spring which forces the head toward the outside of the supporting member.

3. A timepiece comprising the push button device according to claim 1.

4. An electronic device comprising the push button device according to claim 1.

5. The push button device according to claim 1, wherein the elastic member is formed such that a length thereof in a movement direction of the operation member is longer than an operation stroke of the operation member.

6. The push button device according to claim 5, further comprising:

a stroke stopper which restricts the operation stroke of the operation member.

7. The push button device according to claim 6, wherein the stroke stopper is provided on either the supporting member or the head.

8. The push button device according to claim 6, wherein the stroke stopper is provided on a cover provided between the supporting member and the head.

9. The push button device according to claim 6, wherein the elastic member is arranged all over an area between the head and the supporting member excluding the stroke stopper.

10. The push button device according to claim 6, further comprising:

a guide which guides the operation member, wherein the elastic member is in contact with the guide before the operation member is moved.

11. The push button device according to claim 1, wherein a restoring force of the elastic member before the operation member is moved and a restoring force of the elastic member when the operation member is moved are substantially the same.

12. The push button device according to claim 11, wherein at least some of the plurality of air bubbles in the elastic member are connected to one another.

13. The push button device according to claim 11, wherein the plurality of air bubbles is crushed and deformed along with the movement of the operation member and contraction of the elastic member, and wherein a size of the elastic member in a radial direction of the operation member intersecting with a movement direction of the operation member does not significantly differ or change between before the operation member is moved and when the operation member is moved.

14. The push button device according to claim 11, wherein at least some of the plurality of air bubbles are in crushed states before the operation member is moved.

* * * * *